(No Model.)

P. M. FORRESTER.
CAN FOR REFRIGERATING AND TRANSPORTING MILK.

No. 446,254. Patented Feb. 10, 1891.

ATTEST.
Victor J. Evans
A. L. Southerland

INVENTOR,
Philip M. Forrester
By W. A. Redmond
his atty.

UNITED STATES PATENT OFFICE.

PHILIP M. FORRESTER, OF SUNBURY, PENNSYLVANIA.

CAN FOR REFRIGERATING AND TRANSPORTING MILK.

SPECIFICATION forming part of Letters Patent No. 446,254, dated February 10, 1891.

Application filed August 12, 1890. Serial No. 361,774. (No model.)

*To all whom it may concern:*

Be it known that I, PHILIP M. FORRESTER, a citizen of the United States, residing at Sunbury, in the county of Northumberland and State of Pennsylvania, have invented certain new and useful Improvements in Cans for Refrigerating and Transporting Milk; and I do hereby declare the following to be a full, clear, and exact description of the invention, such as will enable others skilled in the art to which it appertains to make and use the same.

This invention relates, generally, to milk-cans, and particularly to that class of milk-cans specially adapted for refrigerating and transporting milk; and it has for its object to provide a can of this class in which milk may be transported without any liability to churn and in which the milk will be kept cool; and it consists of the parts and combinations of parts hereinafter set forth and claimed.

Figure 1:
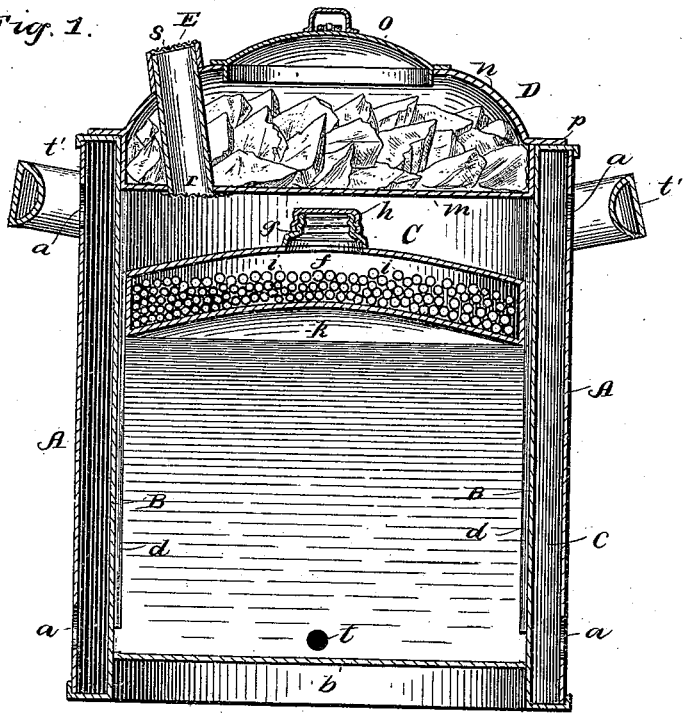
Figure 2:
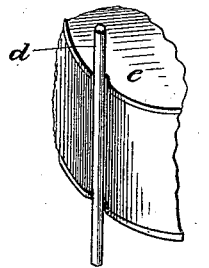

In the accompanying drawings, forming a part of this specification, Figure 1 is a vertical section through my improved can, and Fig. 2 a detail perspective.

Similar letters refer to similar parts in both the views.

A represents the outer wall, and B the inner wall of my improved can, the former having a series of perforations $a$ formed therein near its upper and lower ends. As will be noticed, the bottom $b$ of the can is secured in place a short distance above the bottom edge of the inner wall in order to prevent wear or injury thereto during transportation, and that the two walls are connected at their bottom and top, thus forming an air-chamber $c$, through which the air may circulate, finding its entrance thereto and exit therefrom through the series of perforations $a$ in the outer wall, in order to provide for a constant circulation of air about the outer surface of the inner wall to absorb the heat therefrom, as thrown off from the milk.

To the inner surface of the wall B, I secure the vertical guide-strips $d$, diametrically opposite each other, which extend from near the bottom to near the top of said wall, the object of which is to guide the weighted float or follower C vertically in the can and prevent it turning horizontally and from binding in its movement in the can. The float or follower C consists of a cylindrical vessel having a concave bottom and a convex top formed with grooves $e$ at opposite sides on its periphery, adapted to fit loosely the guiding-strips $d$, and having a central opening $f$ in its top surrounded by a screw-neck $g$, adapted to receive a screw-cap $h$ to close said opening. In this vessel ballast $i$, which may be in the form of shot or iron scraps or any other metal, lead preferred, is placed until the desired weight is secured which is adjusted according to the size of the can and the quantity of milk to be carried, the object being to secure a weight sufficient to prevent the milk when the can is moved from being agitated, especially during transportation, and thus prevent the raising of the vessel off the milk; or, in other words, the vessel should be so weighted down that it will hold the milk against agitation and consequent churning, no matter how much the can itself may be jarred or moved. The bottom of the vessel is formed concave for the purpose of forming an air-chamber $k$ between it and the milk, in order to cause the vessel to float or rest on the surface of the same and prevent the vessel from sinking therein from its own weight, which it might have a tendency to do were the bottom formed flat, and more especially would it be liable so to do since the vessel edge is not intended to fit air-tight inside the can.

The lid D of the can is formed in the shape of a receptacle having a flat bottom $m$ and a convex top $n$, having a central opening provided with a cover $o$ and flanges $p$, adapted to fit over and rest on the top of the can. A tube E is fitted in openings formed in the top and bottom of the lid D, in order to provide a vent for the escape of animal heat and gases arising from the milk, and a wire-cloth $r$ is fitted and secured over the lower end of said tube to prevent the entrance of dirt or other extraneous matter to the milk. A cap $s$, having wire-cloth over one end adapted to fit over the upper projecting end of the tube, is also provided to exclude dirt from the tube and is made removable in order to more easily clean the same. Ice is to be packed closely in the receptacle through its opening in the top, and when so packed will keep the milk in the can cool. An opening $t$ is formed through both walls of the can near the bottom, in which a faucet is secured to draw off the contents of the can, and handles $t'$ are secured to the outer wall, whereby the can may be readily handled.

It will be observed that the weighted float or follower will rest on the surface of the milk without sinking in the same, owing to its concave bottom forming an air-chamber, and at the same time its weight will prevent the milk being agitated while in transit, and that said follower is prevented turning in a horizontal plane and also from tipping by the guiding-strips. It will also be observed that the air-chamber formed by the double walls, together with the lid filled with ice and provided with a dirt-excluding vent, will keep the milk cool and sweet in warm weather and permit the escape of all odors from the same.

Having thus described my invention, what I claim as new, and desire to secure by Letters Patent, is—

1. The combination, with a can for transporting milk, having double walls, the outer wall of which is perforated, and vertical guiding-strips secured to the inner surface of the inner wall, of a gravitating float or follower consisting of a cylindrical vessel having vertical grooves in its periphery, a solid imperforate concave bottom, and a suitable removable weight or weights within said vessel, substantially as described.

2. The combination, with a can for transporting milk, having double walls, the outer of said walls being formed with perforations, of a refrigerating-lid consisting of a cylindrical receptacle having a flange on its periphery and a closed top, a tube having its ends covered by wire-cloth extending through the top and bottom of said receptacle, and a weighted float or follower adapted to fit within and rest on the surface of the contents of the can, substantially as described.

3. The combination, with a can having an air-chamber between its walls, the outer of said walls being formed with openings, and a gravitating float or follower consisting of a cylindrical vessel having a concave solid imperforate bottom, a screw-threaded opening in its top, a cap therefor, and shot or other metal ballast for said vessel, of a refrigerating-lid for said can, consisting of a cylindrical receptacle having a flange on its periphery, a top having an opening therein, a cover for said opening, a tube extending through the bottom and top of said receptacle, having its lower end covered with wire-cloth, and a cap having one end covered with wire-cloth, adapted to fit the upper end of said tube, substantially as described.

In testimony whereof I affix my signature in presence of two witnesses.

PHILIP M. FORRESTER.

Witnesses:
J. H. ROCKEFELLER,
WM. A. SHIPMAN.